United States Patent [19]

Hancock

[11] 4,185,695

[45] Jan. 29, 1980

[54] TEMPORARY FOOTWEAR FOR HOOFED ANIMALS

[76] Inventor: Reginald P. Hancock, 1463 Obispo Ave., Long Beach, Calif. 90804

[21] Appl. No.: 854,468

[22] Filed: Nov. 23, 1977

[51] Int. Cl.$^2$ ............................. A01L 3/00; A01L 5/00
[52] U.S. Cl. ................................. 168/18; 168/26
[58] Field of Search .................. 168/22, 1, 2, 3, 4, 168/11, 12, 18, 19, 26, 27, 28

[56] References Cited

U.S. PATENT DOCUMENTS

| 240,247 | 4/1881 | Garcelon | 168/18 |
| 1,054,563 | 2/1913 | Kiso | 168/18 |
| 1,274,483 | 8/1918 | Wiesenberg | 168/18 |
| 3,967,683 | 7/1976 | Ensinozo | 168/4 |

*Primary Examiner*—Hugh R. Chamblee
*Attorney, Agent, or Firm*—Blakely, Sokoloff, Taylor & Zafman

[57] ABSTRACT

Temporary footwear for a shod or unshod hoofed animal, particularly useful when the animal is required to stand in a confined space such as in a trailer for long periods. The resilient footwear includes an upper and lower band which engage the hoof and a plurality of straps which are integrally formed with the lower band, and which are generally disposed across the lower surface of the hoof. A moist pack is retained against the lower surface of the hoof by the straps. The footwear in addition to providing protection and keeping the hoof moist also promotes circulation of the hoof.

11 Claims, 5 Drawing Figures

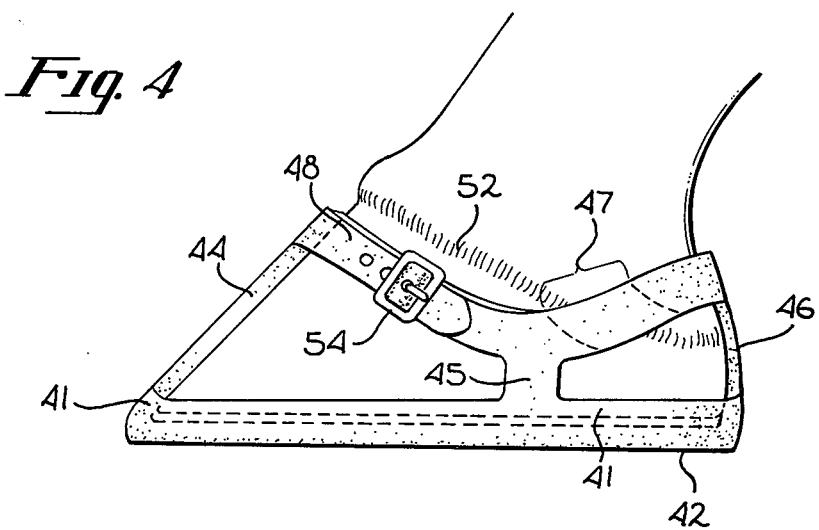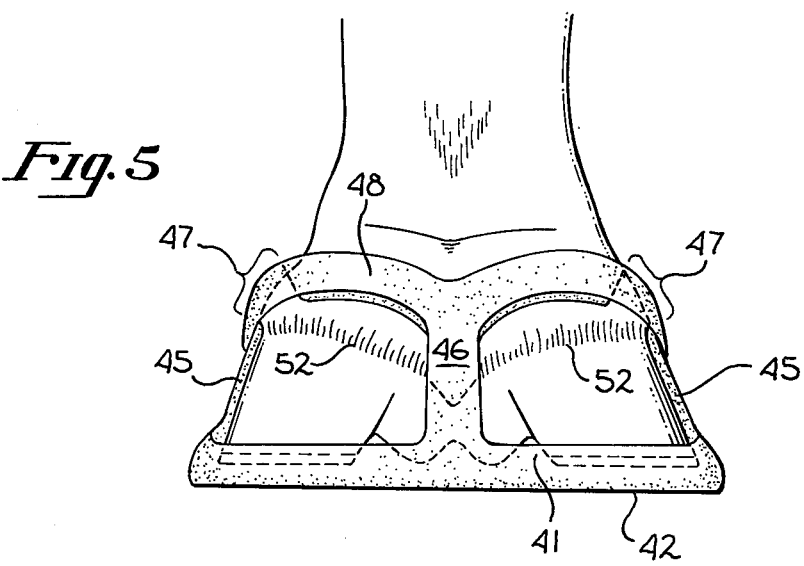

TEMPORARY FOOTWEAR FOR HOOFED ANIMALS

BACKGROUND OF THE INVENTION

1. Field of the Invention

The invention relates to the field of horseshoes and footwear for hoofed animals, particularly horses.

2. Prior Art

Numerous types of footwear for hoofed animals, other than metal horseshoes, are known and used. For example, urethane boots are commercially available and used to reduce shock from very hard surfaces and to provide traction in slippery streets and snow. One temporary horseshoe is shown in U.S. Pat. No. 359,897. This temporary horseshoe provides protection, however, does not aid in relieving the hoof problems caused by prolonged, motionless standing.

Other boot-like footwear is known in the prior art such as that shown in U.S. Pat. No. 3,794,119. This footwear is not particularly suited for use when the animal is restrained in its movement since it completely encloses the hoof, allowing it to heat up and loose necessary moisture.

BRIEF DESCRIPTION OF THE DRAWINGS

FIG. 4 is a side view of a hoof wearing an alternate embodiment of the footwear of the present invention; and FIG. 5 is another elevation of the alternate embodiment of FIG. 4 as viewed towards the heel of the hoof.

SUMMARY OF THE INVENTION

Temporary footwear for a hoofed animal is described. The footwear includes a lower hoof encircling band for engaging the periphery of a hoof. This band includes an upstanding lip and a generally annular section transverse to the lip which engages the lower surface of the hoof. An upper hoof encircling band is disposed about the hoof above the lower band. A plurality of straps interconnect the lower and upper bands, particularly to secure the lower band in its proper position. A plurality of retaining straps are disposed across the opening defined by the annular section of the lower band. These retaining straps are used to retain a moist pack against the lower surface of the hoof.

DETAILED DESCRIPTION OF THE INVENTION

Temporary footwear for a hoofed animal such as a horse, mule, ass or zebra is described. The temporary footwear is particularly useful when the animal is required to stand in a very confining space such as in a van, trailer, aircraft or on a rampway, or the like. The temporary footwear provides protection for the animal particularly against its own metal horseshoes, provides moisture for the hoof and assists in blood circulation in the hoof and helps maintain moisture in the hoof.

Before describing the present invention, the problem encountered when moving a hoofed animal in a van, trailer, or the like, or whenever the animal is required to stand motionless for a long period of time, demonstrates the need for the present invention. In hoofed animals, particularly horses, movement of the foot is required in order for blood to circulate through the foot. Movement of the foot provides a "pumping mechanism" which is necessary in order for blood to return to the heart through the venous plexuses. For a generaly discussion of this pumping mechanism, see "The Principles of Horseshoeing" by Doug Butler, copyrighted 1974, page 110. During long periods of standing in one place the foot circulation is greatly reduced. Among other problems this causes a general drying of the hoof. This may result in a loss of elasticity to the frog and a general brittleness to the hoof. Another problem encountered in transporting hoofed animals is that often the van or trailer floor, or the like, becomes slippery from debris. If the animal should fall, the underside of the animal can be cut by the rear horseshoes.

As will be seen, the present invention provides footwear which encourages the natural pumping action of the foot, and provides a means for maintaining the natural moisture content of the hoofs.

Figure 2:
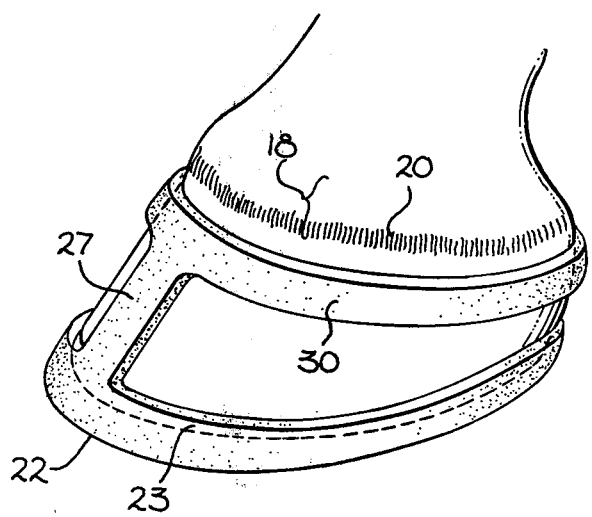
FIG. 2 is a perspective view of a hoof fitted with footwear of the present invention.
Figure 3:
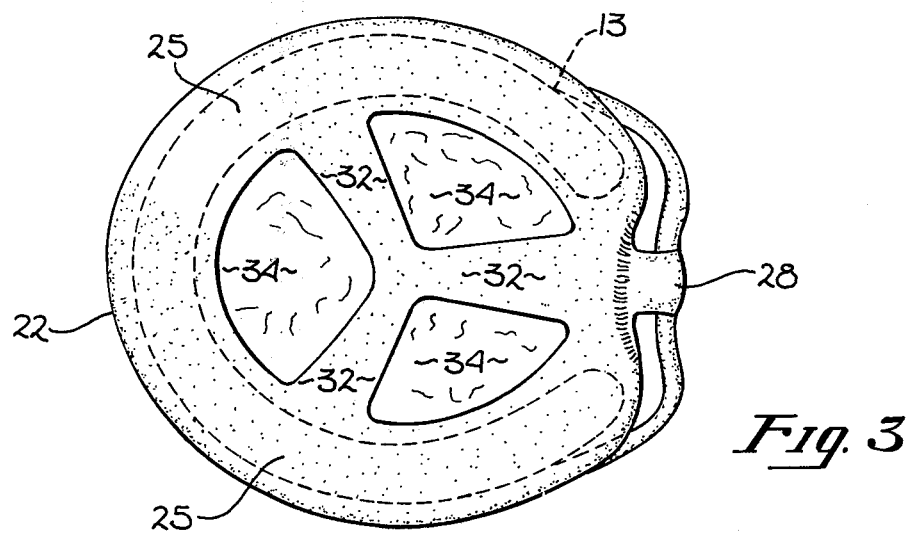
FIG. 3 is a plan, bottom view of the footwear of FIG. 2 including the packing.

Referring first to FIGS. 2 and 3, the footwear of the present invention includes a lower hoof encircling band 22 having an upstanding lip 23 which engages the periphery of the hoof. The band 22 also includes an annular section 25 (FIG. 3) which is generally transverse to the lip 23. An upper hoof encircling band 30 for the embodiments of FIGS. 2 and 3 is formed to engage the hoof below the coronary band 18 and perioplic ring 20. Two straps interconnect the upper and lower band. The front strap 27 is illustrated clearly in FIG. 2. The rear strap 28 is similar to strap 27 and interconnects the upper and lower bands. The position of the upper band on the hoof to a large extent is controlled by the length of the straps 27 and 28.

A plurality of radially disposed straps 32, as are best seen in FIG. 3, are connected to the inner edge of the annular section 25 and disposed across the opening defined by this annular section. The straps 32 form a web or mesh which is used to retain a damp or moist packing 34 against the lower surface of the hoof.

In the presently preferred embodiment the upper and lower bands and straps are fabricated as a single integral member from a resilient material such as rubber, resilient flexible plastic, or other such material.

Figure 1:
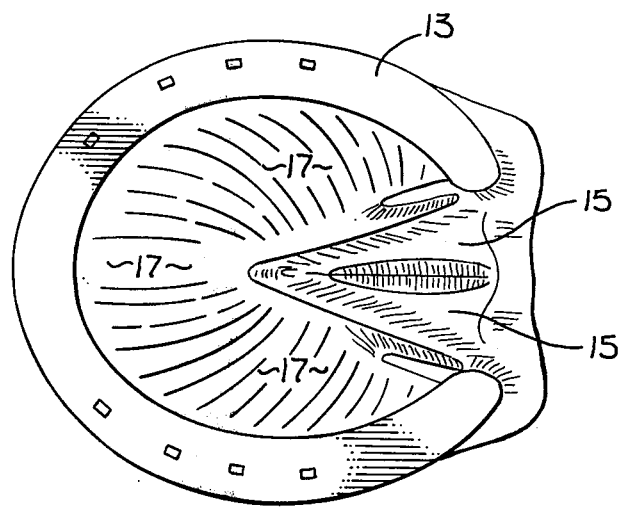
FIG. 1 is a plan bottom view of a hoof with an iron horseshoe.

Before employing the footwear of the present invention, the lower surface of the hoof is cleaned of debris. Referring to FIG. 1, a lower surface of a hoof is illustrated which includes an iron horseshoe 13. A moisture pack such as moistened clay is placed into the frog area 15 and on the sole 17. Then the upper band 30 is slid over the hoof and the lower band 23 is brought into place around the hoof. As is best seen in FIG. 3, the section 25 of the lower band covers the shoe 13. The straps 32 retain the moist packing 34 in place against the lower surface of the hoof.

The packing of the footwear in addition to keeping the hoof moist encourages the natural circulation of the foot. When the animal rests on the packing a slight rocking action is induced. This rocking allows the natural pumping action of the blood through the foot to occur. Thus, the footwear not only protects the animal from its own metal shoes, but also keeps the hoofs in a healthy condition. The web or mesh formed by the straps 32 allows air to circulate around the lower surface of the hoof. Upper construction (23, 27, 28 & 30) also allows air circulation around the walls of the hoof which prevents the hoof from overheating. The resilient nature of the lower band and straps 32 give the animal added traction and helps prevent it from falling.

Referring to the alternate embodiment of FIGS. 4 and 5, the footwear again includes an upstanding lip 41 and an annular shaped lower section 42. Again, a plurality of straps corresponding to straps 32 of FIG. 3 are employed to retain a moist packing against the lower surface of the hoof. The upper band 48 of the embodiment of FIGS. 4 and 5 again encircles the hoof and is connected to the lower band by a toe strap 44, heel strap 46 and two side straps 45. A buckle 54 allows the upper band 48 to be adjusted. A buckle (or other fastener) may also be employed in the embodiment of FIGS. 2 and 3 on the upper band 30.

In the embodiments of FIGS. 2 and 3, the upper band 30 encircles the hoof below the coronary band. In the embodiment of FIGS. 4 and 5, the upper band 48 is formed to engage the hoof below the coronary band 52 in the toe region and above the coronary band 52 in the heel region. This embodiment is particularly useful for low heeled hoofs. In the embodiment of FIGS. 4 and 5 the upper band 48 should include a pair of recesses on the inside of the band shown in the drawings, a recess 47 to allow the coronary band to pass under the upper band 48 without Thus, footwear for a hoofed animal has been described which is particularly useful when the animal must stand in one position for long periods of time. The footwear encourages natural circulation, keeps the hoof moist and moreover, helps protect shod animals from injuring themselves.

I claim:

1. Temporary protective footwear for a hoofed animal which has been shod comprising:
   a lower hoof encircling band for engaging the periphery of a hoof, said lower band including:
   (i) an upstanding lip; and
   (ii) a generally transverse member coupled to said lip which engages the lower surface of a shoe worn by said animal, said transverse member comprising a generally transverse annular section and at least one first strap disposed across the opening defined by said annular section;
   a packing means disposed generally between said transverse member and said hoof, said packing means being a means for providing moisture to said hoof and for partially supporting said hoof;
   an upper hoof encircling band for engaging the hoof above said lower band; and
   at least one second strap interconnecting said lower and upper hoof encircling bands;
   whereby said footwear provides protection from said shoe, improves blood circulation in the hoof and keeps the hoof moist.

2. The temporary footwear as defined by claim 1 wherein said packing means is a moisture packing.

3. The footwear defined by claim 1 wherein said upper and lower bands, and said first and second straps are integral members formed from a resilient material.

4. The footwear defined by claim 3 wherein said upper hoof encircling band and said second strap are formed such that said upper band encircles the hoof below the coronary band.

5. The temporary footwear defined by claim 3 wherein said upper hoof encircling band and said second strap are formed such that said upper band encircles the hoof below the coronary band of the hoof in the toe area of the hoof and above the coronary band in the heel area of the hoof.

6. The footwear defined by claim 3 including a fastener disposed in said upper hoof encircling band.

7. Temporary protective footwear for a hoofed animal which has been shod comprising:
   a lower hoof encircling band for engaging the periphery of a hoof, said lower band including an upstanding lip and an annular section which is generally transverse to said upstanding lip, said annular section for disposal on the lower surface of a shoe worn by said animal;
   an upper hoof encircling band for disposal on said hoof above said lower band;
   a plurality of first straps disposed between said upper and lower bands;
   a plurality of second straps disposed across the opening defined by said annular section of said lower band; and
   a packing means for placement between said lower surface of the hoof and said second straps, for providing moisture to said hoof and for partially supporting said hoof;
   whereby said temporary footwear provides protection from said shoe, aids in promoting circulation in the hoof and keeps the hoof moist.

8. The footwear defined by claim 7 wherein said bands and straps are integral and formed from a resilient material.

9. The footwear defined by claim 8 wherein said upper band engages said hoof below said coronary band.

10. The footwear defined by claim 9 wherein said upper band engages said hoof below the coronary band in the toe area and above the coronary band in the heel area.

11. The footwear defined by claim 10 wherein said upper band includes recesses to allow the coronary band to pass under said upper band.

* * * * *